United States Patent
Chien et al.

(10) Patent No.: US 10,613,366 B2
(45) Date of Patent: Apr. 7, 2020

(54) DISPLAY DEVICE

(71) Applicant: AU Optronics Corporation, Hsin-Chu (TW)

(72) Inventors: Chih-Wei Chien, Hsin-Chu (TW);
Chih-Kang Wu, Hsin-Chu (TW);
Chun-Yuan Chen, Hsin-Chu (TW);
Shau-Yu Tsai, Hsin-Chu (TW);
Chih-Ling Hsueh, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/430,779

(22) Filed: Jun. 4, 2019

(65) Prior Publication Data

US 2019/0285933 A1    Sep. 19, 2019

Related U.S. Application Data

(63) Continuation of application No. 15/404,709, filed on Jan. 12, 2017, now abandoned.

(30) Foreign Application Priority Data

Jan. 14, 2016 (TW) .............................. 105101125 A
Aug. 23, 2016 (TW) .............................. 105126939 A

(51) Int. Cl.
*G02F 1/1333* (2006.01)
*G02F 1/1335* (2006.01)

(52) U.S. Cl.
CPC .. *G02F 1/133308* (2013.01); *G02F 1/133528* (2013.01); *G02F 2001/13332* (2013.01); *G02F 2202/28* (2013.01)

(58) Field of Classification Search
CPC ......... G02F 1/133308; G02F 1/133528; G02F 2001/13332
See application file for complete search history.

(56) References Cited

U.S. PATENT DOCUMENTS

| | | | |
|---|---|---|---|
| 7,027,112 B2 | 4/2006 | Wang et al. | |
| 2008/0068529 A1* | 3/2008 | Tebbit | G02F 1/133308 349/58 |
| 2008/0101002 A1 | 5/2008 | Kim et al. | |
| 2008/0143949 A1 | 6/2008 | Ino | |
| 2009/0011197 A1 | 1/2009 | Matsuhira | |
| 2012/0120364 A1 | 5/2012 | Wu et al. | |
| 2013/0300975 A1 | 11/2013 | Suzuki | |
| 2015/0260907 A1 | 9/2015 | Yang et al. | |

(Continued)

FOREIGN PATENT DOCUMENTS

| | | |
|---|---|---|
| CN | 101852943 B | 5/2012 |
| CN | 102692736 A | 9/2012 |

(Continued)

*Primary Examiner* — Dung T Nguyen
(74) *Attorney, Agent, or Firm* — WPAT, PC

(57) ABSTRACT

A display device includes a first substrate, a first polarizer, and a cover. The first polarizer is located on the first substrate, such that light passing through the first substrate irradiates out from the first polarizer. At least a portion of the cover is located on the first substrate, and the cover extends away from the first polarizer and protrudes from the first substrate. A side of the cover and a side of the first polarizer facing away from the first substrate are coplanar or not coplanar.

18 Claims, 13 Drawing Sheets

(56) References Cited

U.S. PATENT DOCUMENTS

2015/0268490 A1    9/2015   Yang et al.
2018/0157089 A1    6/2018   Morii et al.

FOREIGN PATENT DOCUMENTS

| | | |
|---|---|---|
| CN | 102809833 A | 12/2012 |
| CN | 102809835 A | 12/2012 |
| CN | 102841458 A | 12/2012 |
| CN | 103278952 A | 9/2013 |
| CN | 204101843 U | 1/2015 |
| CN | 105572943 A | 5/2016 |
| TW | 201413329 A | 4/2014 |
| TW | 201616186 A | 5/2016 |

\* cited by examiner

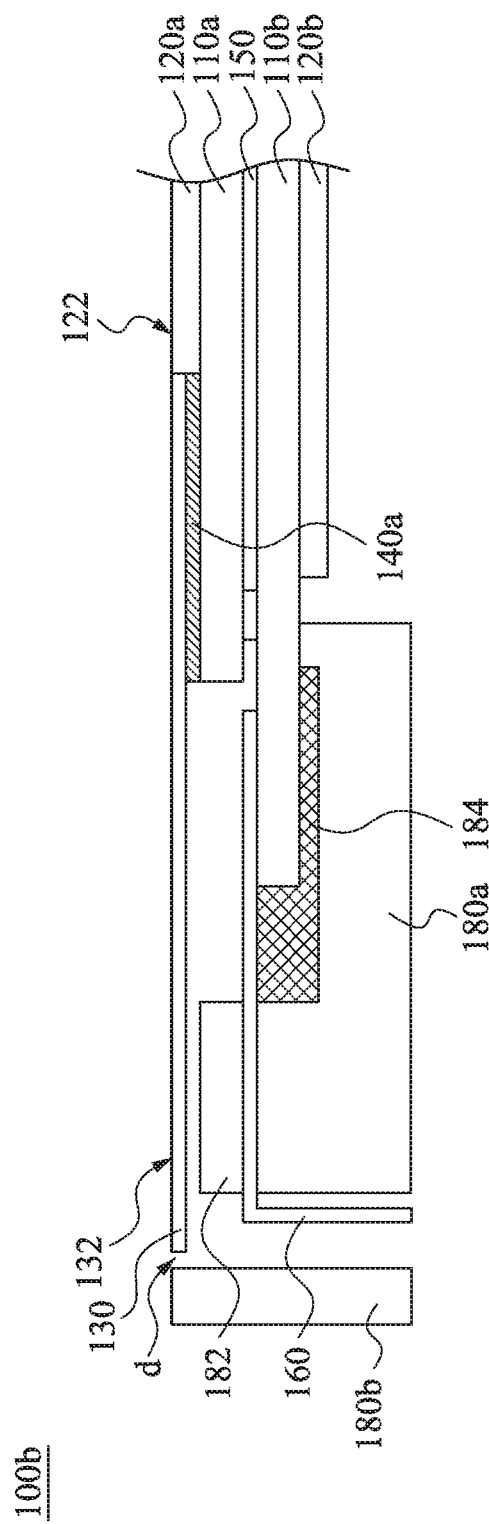
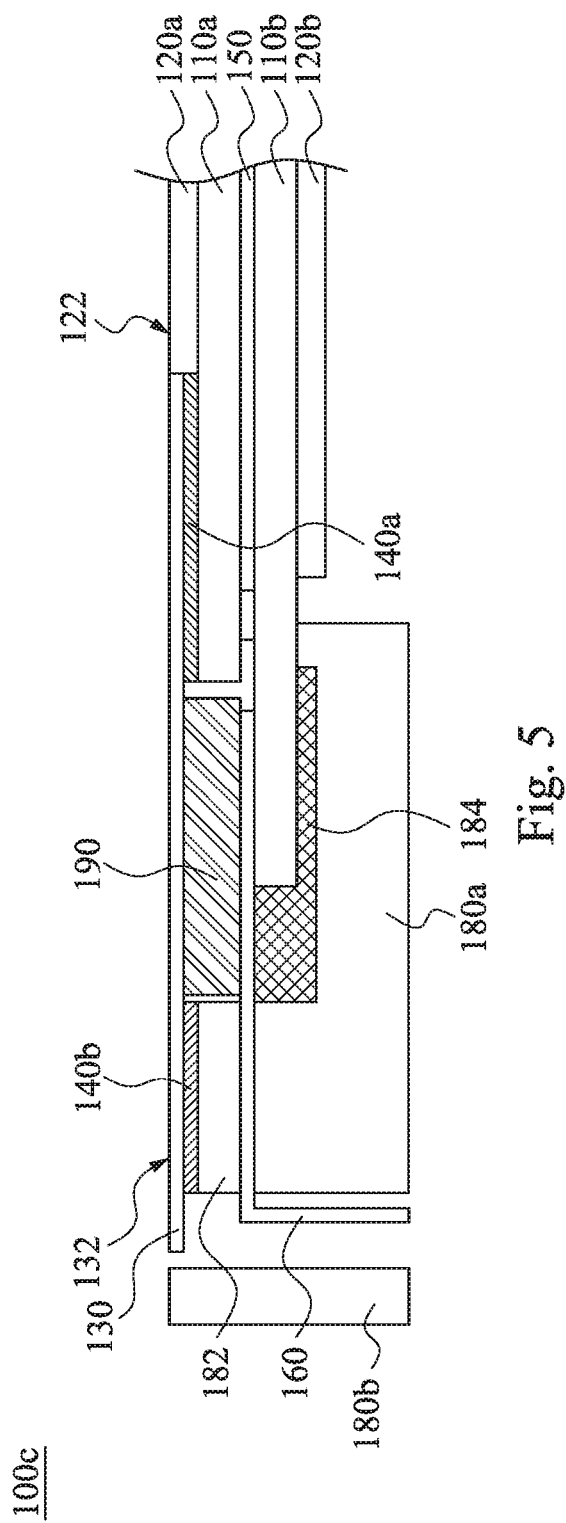

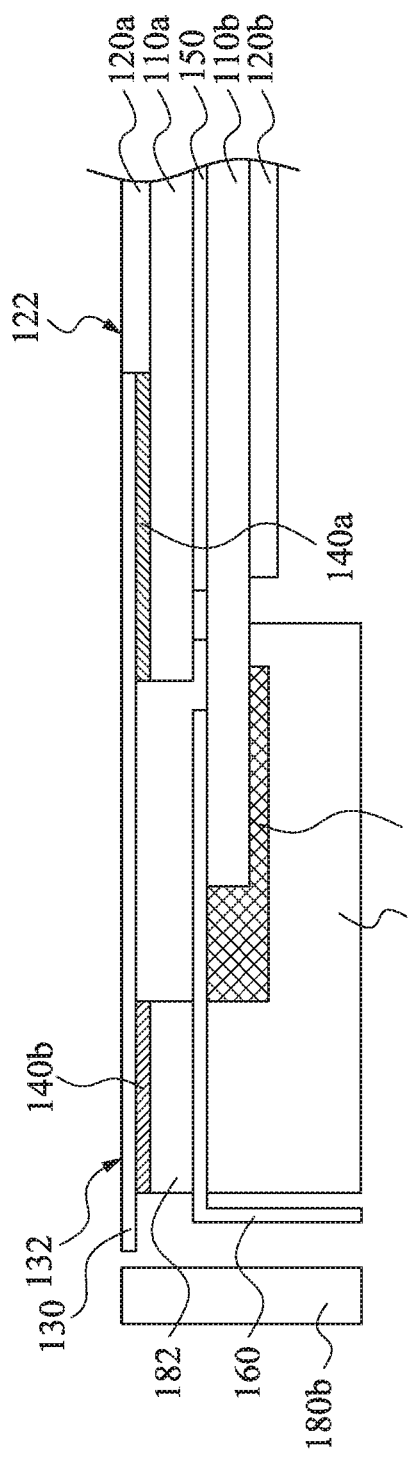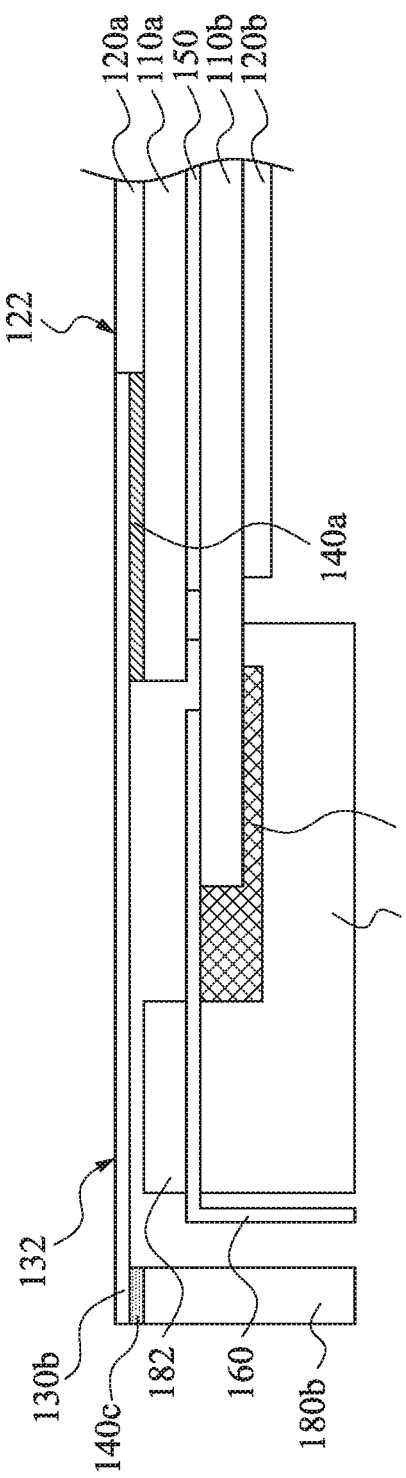

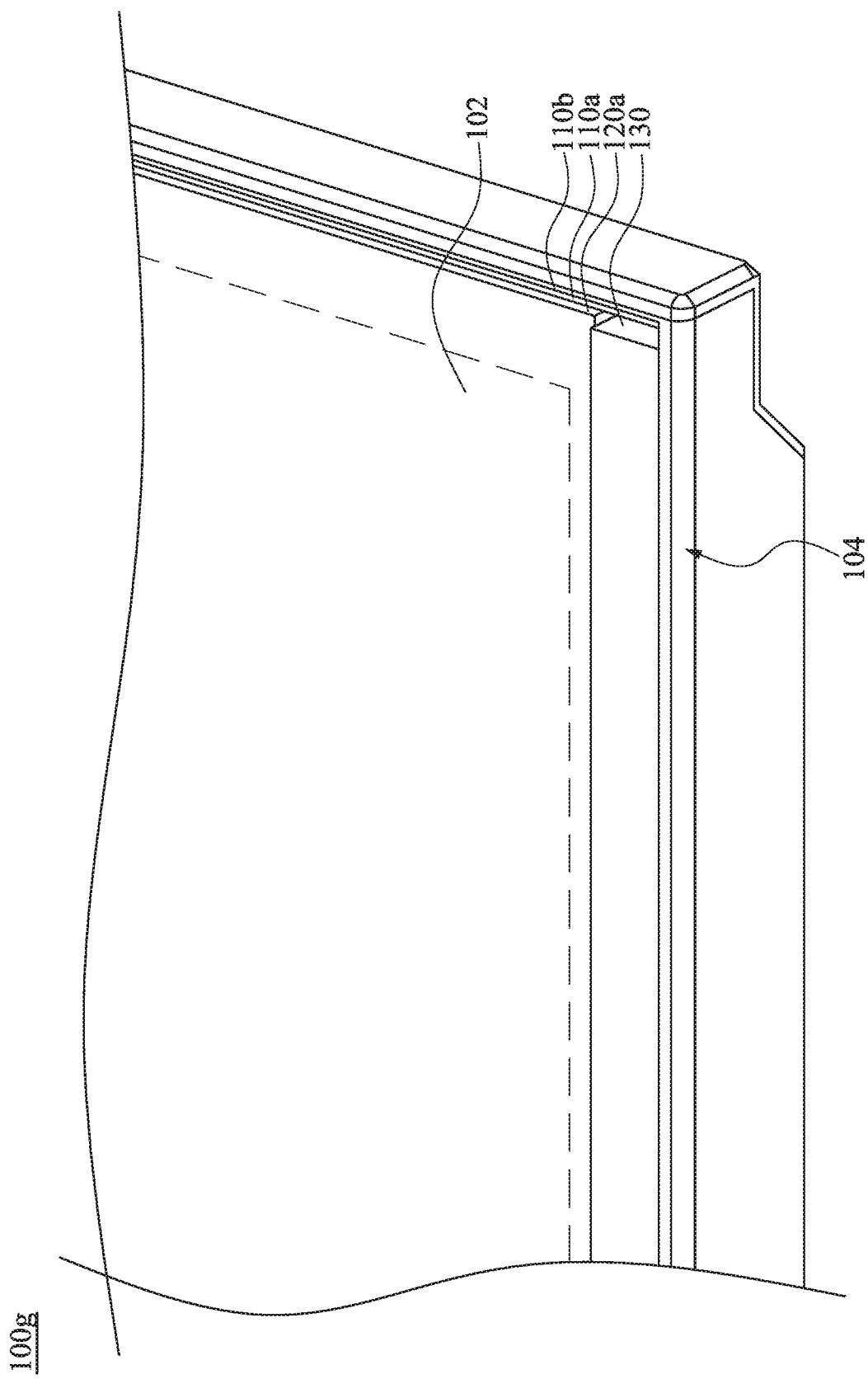

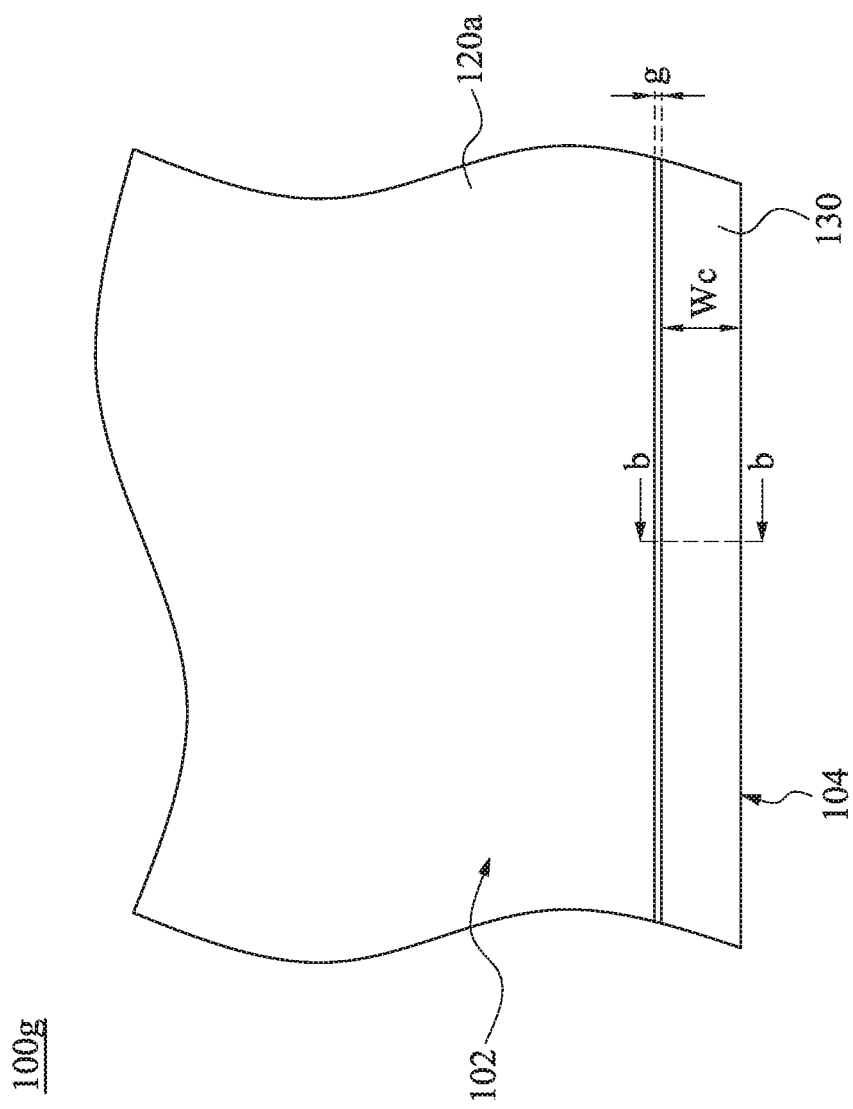

DISPLAY DEVICE

RELATED APPLICATIONS

This is a continuation application of the U.S. application Ser. No. 15/404,709, filed Jan. 12, 2017, which claims priority to Taiwan Application Serial Number 105126939, filed Aug. 23, 2016, and priority to Taiwan Application Serial Number 105101125, filed Jan. 14, 2016, all of which are herein incorporated by reference.

BACKGROUND

Field of Invention

The present invention relates to a display device.

Description of Related Art

The development of display device bezels has become increasingly diverse. In the past, the appearances of display devices had been directed primarily towards narrow bezel designs, and various manufacturers were all devoted to decrease the areas of trim panels covering the peripheries of the display surfaces (i.e., the surfaces facing the viewers).

In recent years, display device manufacturers have further desired to realize edge-to-edge display devices with a rimless design. The display device has a left side and a right side opposite to each other, and an upper side and a lower side opposite to each other. The upper side and the lower side are respectively called a top side and a bottom side. Since the left side, the right side, and the top side of the display device can be fabricated by using the gate on array (GOA) technology, black molding compound can be poured onto the left side, the right side, and the top side to replace the trim panel. However, due to a chip on film (COF) that extends from the bottom side, the bottom side still needs to be shielded by a trim panel. Hence, the relevant structure is the focus of product design.

In addition, if the black molding compound is poured onto the bottom side of the display device, the COF is encapsulated by the black molding compound. As a result, not only is the yield rate of the COF decreased, but its reworkability could also be inferior.

SUMMARY

An aspect of the present invention is to provide a display device.

According to an embodiment of the present invention, a display device includes a first substrate, a first polarizer, and a cover. The first polarizer is located on the first substrate, such that light passing through the first substrate irradiates out from the first polarizer. At least a portion of the cover is located on the first substrate, and the cover extends away from the first polarizer and protrudes from the first substrate. A side of the cover and a side of the first polarizer facing away from the first substrate are coplanar.

In an embodiment of the present invention, the display device further includes a first adhesive layer. The first adhesive layer is located between the cover and the first substrate.

In an embodiment of the present invention, a sum of a thickness of the first adhesive layer and a thickness of the cover is the same as a thickness of the first polarizer.

In an embodiment of the present invention, a width of the cover on the first substrate occupies 20% to 50% of a total width of the cover.

In an embodiment of the present invention, the display device further includes a second substrate and a flexible printed circuit board. The second substrate is located on one side of the first substrate facing away from the first polarizer and the cover, and a portion of the second substrate protrudes from the first substrate. The flexible printed circuit board is fixed to the portion of the second substrate, and the flexible printed circuit board extends away from the first substrate. The flexible printed circuit board is shielded by the cover protruding from the first substrate.

In an embodiment of the present invention, the display device further includes a support member. The support member is located between the portion of the second substrate and the cover protruding from the first substrate.

In an embodiment of the present invention, the display device further includes a first frame. The first frame carries the second substrate, and the first frame is shielded by the cover protruding from the first substrate.

In an embodiment of the present invention, the display device further includes a buffer member. The buffer member is located among the first frame, the portion of the second substrate, and the cover protruding from the first substrate.

In an embodiment of the present invention, the first frame has a side wall, and the flexible printed circuit board passes through the side wall.

In an embodiment of the present invention, the display device further includes a second adhesive layer. The second adhesive layer is located between the side wall of the first frame and the cover protruding from the first substrate.

In an embodiment of the present invention, the display device further includes a second frame. The flexible printed circuit board passing through the side wall is located among the second frame, the cover, and the first frame.

In an embodiment of the present invention, the second frame is shielded by the cover protruding from the first substrate. The display device further includes a third adhesive layer. The third adhesive layer is located between the second frame and the cover protruding from the first substrate.

In an embodiment of the present invention, the display device further includes a support member. The support member is located between the cover and the second substrate.

In an embodiment of the present invention, the display device further includes a buffer member. The buffer member is located between the cover and the second substrate.

In an embodiment of the present invention, the display device further includes a second polarizer. The second polarizer is located on one side of the second substrate facing away the first substrate.

In an embodiment of the present invention, a stiffness of the cover is higher than a stiffness of the first polarizer.

In an embodiment of the present invention, a Young's modulus of the cover is in a range from 2 GPa to 220 GPa.

In the aforementioned embodiments of the present invention, since the first polarizer is located on the first substrate and at least a portion of the cover is located on the first substrate, the side of the cover facing away from the first substrate and the side of the first polarizer facing away from the first substrate can be designed as coplanar. This coplanar structure can replace a trim panel on the bottom side of the prior art display device to achieve a rimless visual effect on the bottom side of the display device, thus effectively enhancing aesthetic feeling and tactile sensation and also being advantageous to slimness of the display device. In addition, since the cover extends away from the first polarizer and protrudes from the first substrate, the cover protruding from the first substrate can be used for shielding the electronic components (e.g., a flexible printed circuit board) underneath. It is thus not necessary to pour black molding compound onto the bottom side of the display device so as to shield and encapsulate the electronic components just as the prior art did. Hence, both the yield rates and reworkability of electronic components underneath the cover can be effectively improved.

In addition, according to an embodiment of the present invention, a display device includes a first substrate, a first polarizer, and a cover. The first polarizer is located on the first substrate, such that light passing through the first substrate irradiates out from the first polarizer. At least a portion of the cover is located on the first substrate, and the cover extends away from the first polarizer and protrudes from the first substrate. A height difference (not coplanar) is formed between a side of the cover and a side of the first polarizer facing away from the first substrate, and a gap is formed between the cover and the first polarizer.

In an embodiment of the present invention, the height difference is in a range from −0.1 mm to 0.35 mm.

In an embodiment of the present invention, the height difference is in a range from 0.02 mm to 0.29 mm.

In an embodiment of the present invention, the display device further includes a first adhesive layer. The first adhesive layer is located in a space between the cover and the first substrate, and can further extend to a space between the cover and the second substrate.

In an embodiment of the present invention, a sum of a thickness of the first adhesive layer and a thickness of the cover is greater than a thickness of the first polarizer.

In an embodiment of the present invention, a width of the cover on the first substrate occupies 20% to 65% of a total width of the cover.

In an embodiment of the present invention, the width of the cover on the first substrate occupies 34% to 58% of the total width of the cover.

In an embodiment of the present invention, the display device further includes a second substrate and a flexible printed circuit board. The second substrate is located on one side of the first substrate facing away from the first polarizer and the cover, and a portion of the second substrate protrudes from the first substrate. The flexible printed circuit board is fixed to the portion of the second substrate and extends away from the first substrate. The flexible printed circuit board is shielded by the cover protruding from the first substrate.

In an embodiment of the present invention, the display device further includes a support member. The support member is located between the second substrate and the cover protruding from the first substrate.

In an embodiment of the present invention, the display device further includes a fourth adhesive layer partially covering the flexible printed circuit board. The first adhesive layer extends to the space between the cover and the second substrate from the space between the cover and the first substrate, and covers the fourth adhesive layer and the flexible printed circuit board.

In an embodiment of the present invention, the display device further includes a light-shielding portion located between the first substrate and the second substrate and near an edge of the first substrate. A vertical projection area of the light-shielding portion on the first polarizer covers the gap between the cover and the first polarizer, and the height difference existing between the side of the cover and the side of the first polarizer facing away from the first substrate is also covered by the vertical projection area of the light-shielding portion on the first polarizer.

In an embodiment of the present invention, the display device further includes a second polarizer. The second polarizer is located on one side of the second substrate facing away the first substrate.

In an embodiment of the present invention, a stiffness of the cover is higher than a stiffness of the first polarizer.

In an embodiment of the present invention, a Young's modulus of the cover is in a range from 0.5 GPa to 500 GPa.

In the aforementioned embodiments of the present invention, since the first polarizer is located on the first substrate and at least a portion of the cover is located on the first substrate, a height difference is formed between the side of the cover and the side of the first polarizer facing away from the first substrate. This structure can replace a trim panel on the bottom side of the prior art display device to still achieve a rimless visual effect on the bottom side of the display device, thus effectively enhancing aesthetic feeling and also being advantageous to slimness of the display device. In addition, since the cover extends away from the first polarizer and protrudes from the first substrate, the cover protruding from the first substrate can be used for shielding the electronic components (e.g., a flexible printed circuit board) underneath. It is thus not necessary to pour black molding compound onto the bottom side of the display device so as to shield and encapsulate the electronic components just as the prior art did. Hence, both the yield rates and reworkability of electronic components underneath the cover can be effectively improved.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows:

FIG. 4 is a cross-sectional view of a display device according to still another embodiment of the present invention;

FIG. 5 is a cross-sectional view of a display device according to yet another embodiment of the present invention;

FIG. 6 is a cross-sectional view of a display device according to another embodiment of the present invention;

FIG. 7 is a cross-sectional view of a display device according to still another embodiment of the present invention;

FIG. 9B is a partially schematic perspective view of a display device according to another embodiment of the present invention (an embodiment with a gap);

FIG. 10B is a partially front view of the display device shown in FIG. 9B;

DESCRIPTION OF THE EMBODIMENTS

Figure 1:
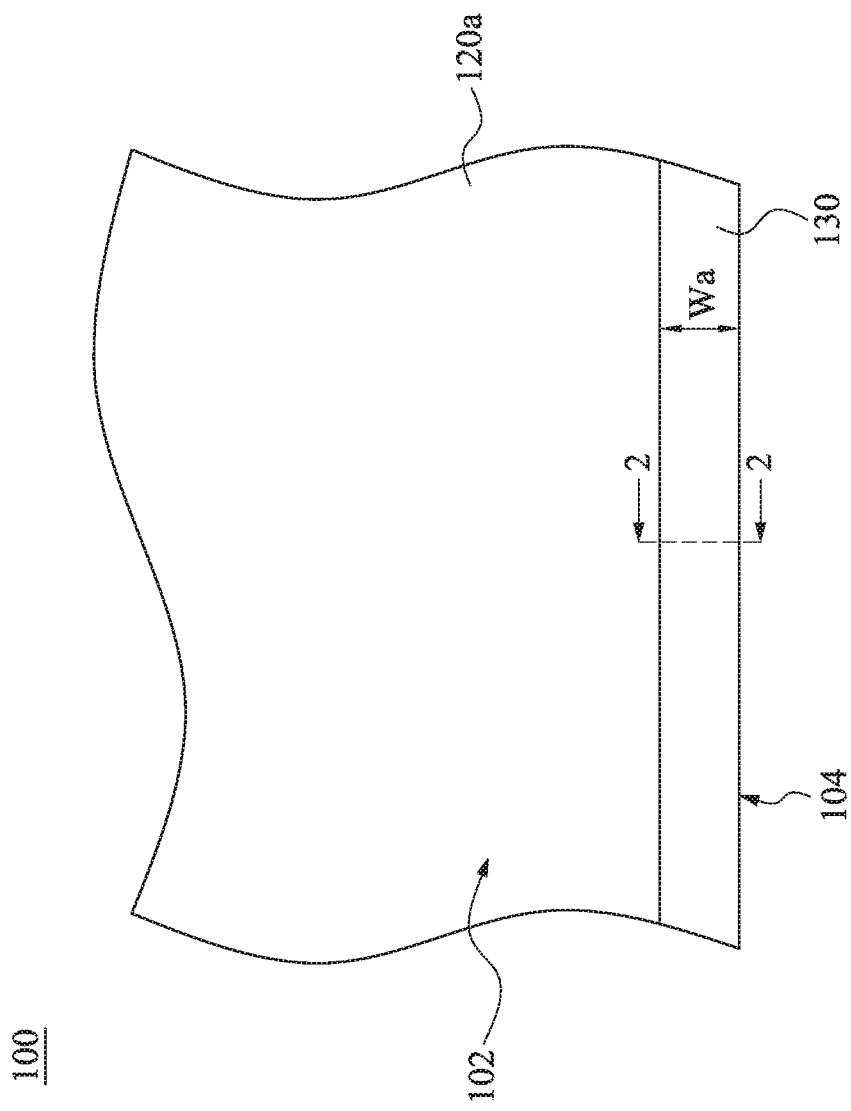
FIG. 1 is a partially front view of a display device according to one embodiment of the present invention.

Reference will now be made in detail to present embodiments of the invention, examples of which are illustrated in the accompanying drawings. Wherever possible, the same reference numbers are used in the drawings and the description to refer to the same or like parts.

FIG. 1 is a partially front view of a display device 100 according to one embodiment of the present invention. As shown in FIG. 1, the display device 100 has a display area 102. The display area 102 can also be called an active area (AA) that is a range in which a viewer can see images. Generally speaking, the display device 100 has a left side and a right side opposite to each other, and a top side (an upper side) and a bottom side 104 (a lower side) opposite to each other. In the following description, a cross-sectional structure near the bottom side 104 of the display device 100 is used for illustration. However, it is to be noted that the design of the present invention is not limited to the bottom side 104 in practical applications.

Figure 2:
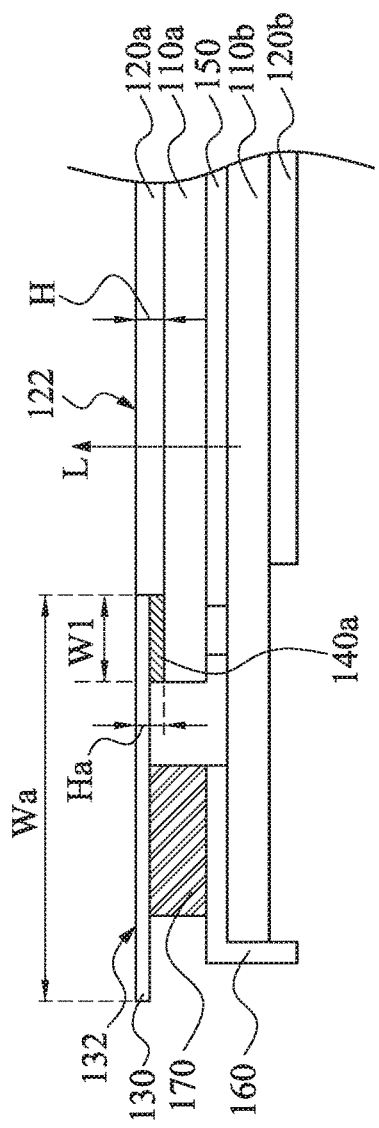
FIG. 2 is a cross-sectional view of the display device taken along line 2-2 shown in FIG. 1.

FIG. 2 is a cross-sectional view of the display device 100 taken along line 2-2 shown in FIG. 1. A description is provided with reference to FIG. 1 and FIG. 2. The display device 100 includes a first substrate 110a, a first polarizer 120a, and a cover 130. The first polarizer 120a is located on the first substrate 110a, such that light L passing through the first substrate 110a irradiates out from the first polarizer 120a. At least a portion of the cover 130 is located on the first substrate 110a, and the cover 130 extends away from the first polarizer 120a and protrudes from the first substrate 110a. In addition, a side 132 of the cover 130 and a side 122 of the first polarizer 120a facing away from the first substrate 110a are coplanar. That is, an outer side of the cover 130 and an outer side of the first polarizer 120a are coplanar. In other words, the cover 130 and the first polarizer 120a are coplanar on a display side of the display device 100, that is, they are coplanar on a surface of the display device 100 facing a viewer.

Since the first polarizer 120a and the portion of the cover 130 are both located on the first substrate 110a, the side 132 of the cover 130 facing away from the first substrate 110a and the side 122 of the first polarizer 120a facing away from the first substrate 110a can be designed as coplanar. This coplanar structure can replace a trim panel directly covering an edge of an upper polarizer in the prior art display device to achieve a rimless visual effect on the bottom side 104 of the display device 100, thus effectively enhancing aesthetic feeling and tactile sensation and also being advantageous to slimness of the display device 100.

In this embodiment, the first substrate 110a may be a color filter (CF) substrate. The display device 100 further includes a second substrate 110b, a second polarizer 120b, and a liquid crystal layer 150. The second substrate 110b may be a thin film transistor array (TFT array) substrate. The liquid crystal layer 150 is located between the first substrate 110a and the second substrate 110b. The second substrate 110b is located on one side of the first substrate 110a facing away from the first polarizer 120a and the cover 130, that is, located underneath the first substrate 110a. The second polarizer 120b is located on one side of the second substrate 110b facing away from the first substrate 110a. The second polarizer 120b, the second substrate 110b, the liquid crystal layer 150, the first substrate 110a, and the first polarizer 120a stacked from bottom to top may be disposed above a direct type or an side type backlight module (not shown).

In addition, a portion of the second substrate 110b protrudes from the first substrate 110a. The display device 100 may further include a flexible printed circuit board 160. A chip may be disposed on a surface of the flexible printed circuit board 160 to form a chip on film (COF). The flexible printed circuit board 160 is fixed to the portion of the second substrate 110b protruding from the first substrate 110a, and the flexible printed circuit board 160 extends away from the first substrate 110a. Since the cover 130 extends away from the first polarizer 120a and protrudes from the first substrate 110a, the cover 130 protruding from the first substrate 110a can be used for shielding the flexible printed circuit board 160 or other electronic components underneath. It is thus not necessary to pour black molding compound onto the bottom side of the display device so as to shield and encapsulate the electronic components just as the prior art did. Hence, both the yield rates and reworkability of the flexible printed circuit board 160 or other electronic components underneath the cover 130 can be effectively improved.

A width W1 of the cover 130 on the first substrate 110a may occupy 20% to 50% of a total width Wa of the cover 130. Designers can determine the percentage relationship between the width W1 and the total width Wa depending on design requirements. For example, when the cover 130 has a high stiffness, an overhanging portion of the cover 130 is not easy to be depressed. Hence, the width W1 of the cover 130 on the first substrate 110a might be reduced after consideration to obtain the wider display area 102 and a better visual experience. When the width W1 of the cover 130 on the first substrate 110a is smaller, the larger first polarizer 120a can be used to be closely adjacent to the cover 130 so as to avoid an obvious gap. Additionally, in greater detail, in the embodiment that the first substrate 110a is the CF substrate and the second substrate 110b is the TFT array substrate, the cover 130 extends away from the first polarizer 120a and protrudes from the CF substrate (i.e., the first substrate 110a), and a vertical projection area of the portion of the cover 130 protruding from the CF substrate (the first substrate 110a) covers the TFT array substrate (i.e., the second substrate 110b).

A Young's modulus of the cover 130 may be in a range from 2 GPa to 220 GPa. The stiffness of the cover 130 may be designed to be higher than or equal to a stiffness of the first polarizer 120a to enhance the strength of an edge of the display device 100. When a stiffness value of the cover 130 is designed to be equal to a stiffness value of the first polarizer 120a, the cover 130 and the first polarizer 120a can use a same material so as to obtain the optimum visual experience. In addition, the cover 130 may be an opaque sheet material (that is, light transmittance is zero), may be a metal plate, such as an aluminum plate, a stainless steel (SUS) plate, a tin plate, a color steel plate, a steel galvanized aluminum cold rolled (SGLC) plate, or a steel electrogalvanized cold rolled (SECC) plate, may be a non-metallic plate, such as a PC plate, a PMMA plate, an ABS plate, a PP plate, a PET plate, a PS plate, a TAC plate and the like, or may be a stack structure of the above materials. However, the present invention is not limited in this regard.

The display device 100 may further include a support member 170. The support member 170 is located between the cover 130 and the second substrate 110b. In this embodiment, the support member 170 is located between the cover 130 protruding from the first substrate 110a and the second substrate 110b protruding from the first substrate 110a. The support member 170 can be used for supporting the cover 130 to avoid depression of a portion of the cover 130 outside the first substrate 110a when being pressed by an external force. The support member 170 may be made of an insulating material (e.g., Mylar) to prevent the support member 170 from being conducted with the flexible printed circuit board 160 and a short circuit thus caused.

Figure 15:
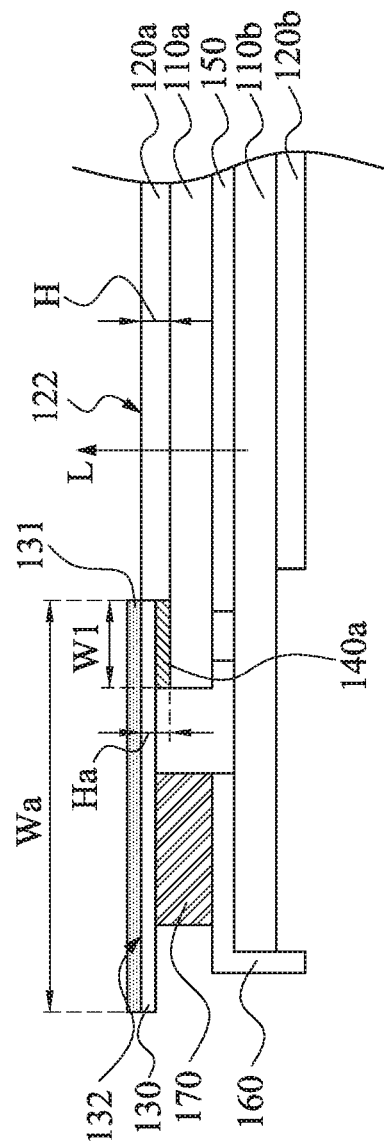
FIG. 15 is a schematic cross-sectional view of a cover according to the present invention.

Additionally, the display device 100 may further include a first adhesive layer 140a. The first adhesive layer 140a is located between the cover 130 and the first substrate 110a. That is, the portion of the cover 130 on the first substrate 110a is fixed through the first adhesive layer 140a. Since the side 132 of the cover 130 and the side 122 of the first polarizer 120a are coplanar, a sum Ha of a thickness of the first adhesive layer 140a and a thickness of the cover 130 is the same as a thickness H of the first polarizer 120a. The first adhesive layer 140a may be glue or film adhesive having an adhesive force of more than 10 kg/cm2. When the first adhesive layer 140a is the glue, it may be UV-curing adhesive, hot melt adhesive, silicone, polyurethane (PUR) adhesive, or AB glue. A viscosity of the first adhesive layer 140a may be in a range from 200 CPs to 350000 CPs. When the first adhesive layer 140a is the film adhesive, it may be a double-sided adhesive tape, a very high bond (VHB) double-sided adhesive tape, or a thermally conductive adhesive tape. However, the present invention is not limited in this regard. In addition, a surface treatment of the cover 130 may be an appearance treatment, such as baking lacquer, anodizing, electrocoating, electroplating, etc., to enhance the aesthetic feeling of the edge of the display device 100. Referring to FIG. 15, in greater detail, the side 132 of the cover 130 facing away from the first substrate 110a has a surface treatment layer 131 to achieve the anti-glare objective and/or anti-reflective objective. For example, the surface treatment layer 131 may be an anti-reflection (AR) film or an anti-glare (AG) film. Similarly, the surface treatment layer 131 may be formed by utilizing baking lacquer, anodizing, electrocoating, electroplating.

It is to be noted that the component materials and the connection relationships between the components that have been described is not repeated. In the following description, other types of display devices will be described.

Figure 3:
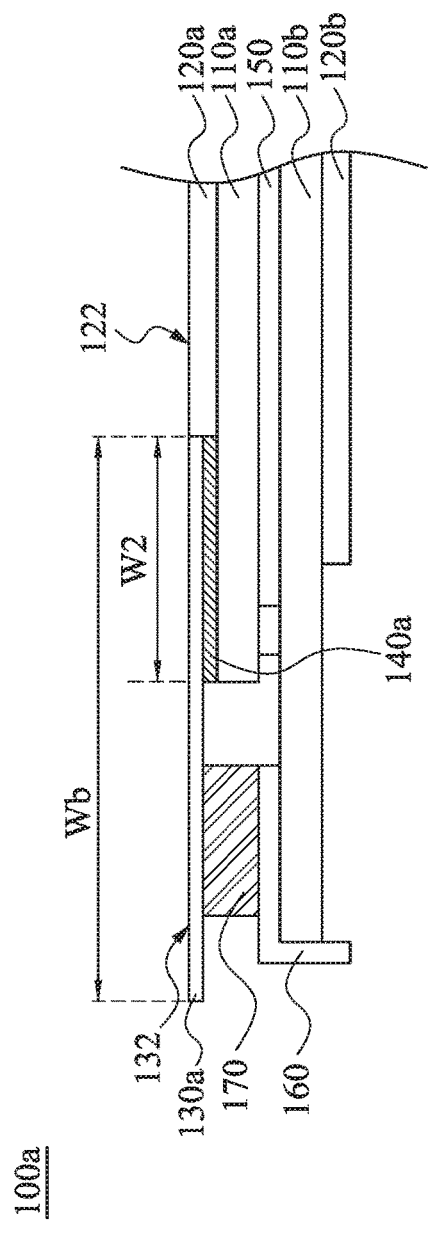
FIG. 3 is a cross-sectional view of a display device according to another embodiment of the present invention.

FIG. 3 is a cross-sectional view of a display device 100a according to another embodiment of the present invention. The display device 100a includes the first substrate 110a, the first polarizer 120a, and a cover 130a. The side 132 of the cover 130a and the side 122 of the first polarizer 120a facing away from the first substrate 110a are coplanar. The difference between this embodiment and the embodiment shown in FIG. 2 is that a width W2 of the cover 130a on the first substrate 110a occupies a higher percentage (e.g., 50%) of a total width Wb of the cover 130b than the percentage (e.g., 20%) of the total width Wa of the cover 130 occupied by the width W1 the cover 130 on the first substrate 110a shown in FIG. 2. Since the width W2 of the cover 130a on the first substrate 110a is increased, the smaller first polarizer 120a can be used.

FIG. 4 is a cross-sectional view of a display device 100b according to still another embodiment of the present invention. The display device 100b includes the first substrate 110a, the first polarizer 120a, and the cover 130. The side 132 of the cover 130 and the side 122 of the first polarizer 120a facing away from the first substrate 110a are coplanar. The difference between this embodiment and the embodiment shown in FIG. 2 is that the display device 100b further includes a first frame 180a and a second frame 180b. The first frame 180a can be used for carrying the second substrate 110b. For example, an adhesive 184 is used to fix the second substrate 110b to the first frame 180a. In this embodiment, both the first frame 180a and the flexible printed circuit board 160 are shielded by the cover 130 protruding from the first substrate 110a.

In addition, the first frame 180a has a side wall 182, and the flexible printed circuit board 160 passes through the side wall 182. In this embodiment, the second frame 180b surrounds lateral sides of the display device 100b. The flexible printed circuit board 160 passing through the side wall 182 is located among the second frame 180b, the cover 130, and the first frame 180a. In this embodiment, the side wall 182 of the first frame 180a can replace the support member 170 shown in FIG. 2 and FIG. 3. Although the side wall 182 of the first frame 180a does not abut against the cover 130, an overhanging portion of the cover 130 will move downwards to abut against the side wall 182 of the first frame 180a when an external force presses the cover 130 protruding from the first substrate 110a. That is, the side wall 182 of the first frame 180a still has the function of supporting the cover 130, and can prevent the cover 130 from being excessively depressed and damaged. After the external force is removed, the cover 130 can return to a position above the side wall 182 of the first frame 180a by utilizing its own elasticity.

In this embodiment, the first frame 180a may be made of plastic. The second frame 180b may be made of metal (e.g., aluminum). However, the present invention is not limited in this regard.

FIG. 5 is a cross-sectional view of a display device 100c according to yet another embodiment of the present invention. The display device 100c includes the first substrate 110a, the first polarizer 120a, and the cover 130. The side 132 of the cover 130 and the side 122 of the first polarizer 120a facing away from the first substrate 110a are coplanar. The difference between this embodiment and the embodiment shown in FIG. 4 is that the display device 100c further includes a buffer member 190 and a second adhesive layer 140b. The buffer layer 190 is located between the cover 130 and the second substrate 110b. In this embodiment, the buffer member 190 is located among the first frame 180a, the second substrate 110b protruding from the first substrate 110a, and the cover 130 protruding from the first substrate 110a. Additionally, the second adhesive layer 140b is located between the side wall 182 of the first frame 180a and the cover 130 protruding from the first substrate 110a.

Through disposing the buffer member 190 and the second adhesive layer 140b, an overhanging portion of the cover 130 can be reduced, such that the cover 130 is co-supported by the first substrate 110a, the buffer member 190, and the side wall 182 of the first frame 180*a*. When an external force presses the cover 130, the cover 130 is not easy to be depressed and damaged. In addition, since two edges of the cover 130 are respectively fixed to the first substrate 110*a* and the side wall 182 of the first frame 180*a* by using the first adhesive layer 140*a* and the second adhesive layer 140*b*, the stability of the cover 130 can be improved.

In this embodiment, a material of the buffer member 190 may be sponge. However, the present invention is not limited in this regard.

FIG. 6 is a cross-sectional view of a display device 100*d* according to another embodiment of the present invention. The display device 100*d* includes the first substrate 110*a*, the first polarizer 120*a*, and the cover 130. The side 132 of the cover 130 and the side 122 of the first polarizer 120*a* facing away from the first substrate 110*a* are coplanar. The difference between this embodiment and the embodiment shown in FIG. 5 is that the display device 100*d* does not have the buffer member 190. With such a design, when an overhanging portion of the cover 130 are pressed by an external force, although a center area of the cover 130 is possibly depressed temporarily, the center area of the cover 130 can return by utilizing its own elasticity after the external force is removed because two edges of the cover 130 are respectively fixed to the first substrate 110*a* and the side wall 182 of the first frame 180*a* by using the first adhesive layer 140*a* and the second adhesive layer 140*b*. Hence, the cover 130 is not easily damaged.

FIG. 7 is a cross-sectional view of a display device 100*e* according to still another embodiment of the present invention. The display device 100*e* includes the first substrate 110*a*, the first polarizer 120*a*, and a cover 130*b*. The side 132 of the cover 130*b* and the side 122 of the first polarizer 120*a* facing away from the first substrate 110*a* are coplanar. The difference between this embodiment and the embodiment shown in FIG. 4 is that the second frame 180*b* is shielded by the cover 130*b* protruding from the first substrate 110*a*, and the display device 100*e* further includes a third adhesive layer 140*c*. The third adhesive layer 140*c* is located between the second frame 180*b* and the cover 130*b* protruding from the first substrate 110*a*. That is, the cover 130*b* not only extends above the side wall 182 of the first frame 180 but also extends above the second frame 180*b*, and is fixed to the second frame 180*b* by using the third adhesive layer 140*c*.

In this embodiment, since the second frame 180*b* is shielded by the cover 130*b*, a gap d shown in FIG. 4 is not formed. As a result, a visual experience on a display side of the display device 100*e* can be further enhanced.

Figure 8:
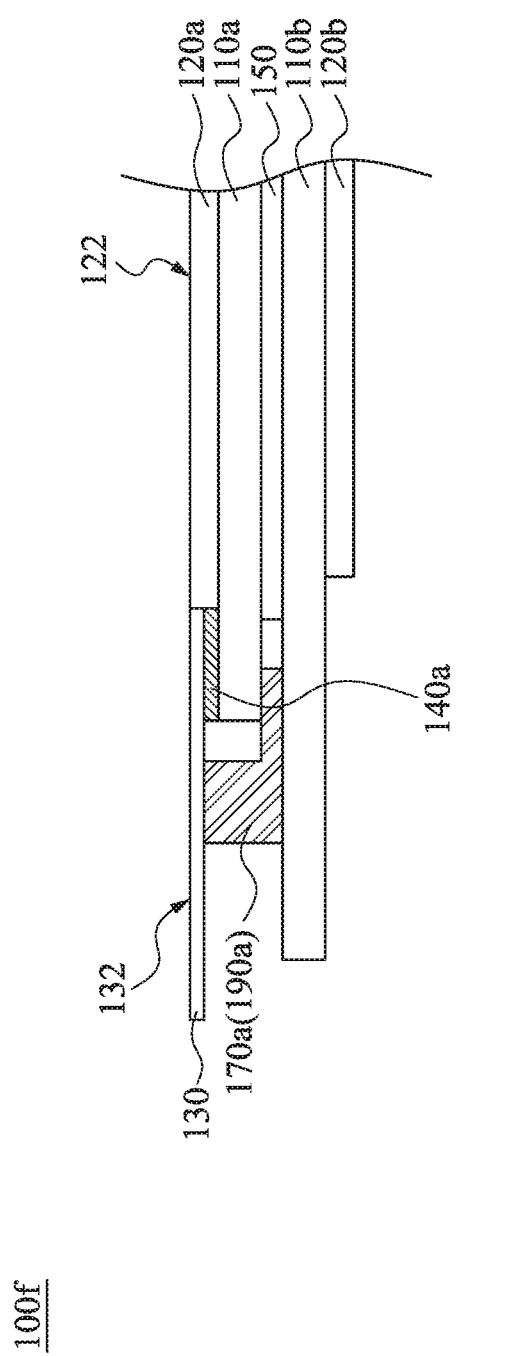
FIG. 8 is a cross-sectional view of a display device according to yet another embodiment of the present invention.

FIG. 8 is a cross-sectional view of a display device 100*f* according to yet another embodiment of the present invention. The display device 100*f* includes the first substrate 110*a*, the first polarizer 120*a*, and the cover 130. The side 132 of the cover 130 and the side 122 of the first polarizer 120*a* facing away from the first substrate 110*a* are coplanar. The difference between this embodiment and the embodiment shown in FIG. 2 is that not only is a portion of a support member 170*a* of the display device 100*f* located between the cover 130 protruding from the first substrate 110*a* and the second substrate 110*b*, but other portions also further extend between the first substrate 110*a* and the second substrate 110*b*. Hence, the support member 170*a* can have a cross-sectional shape of L.

Additionally, in another embodiment, a buffer member 190*a* may replace the support member 170*a*. The difference between this embodiment and the embodiment shown in FIG. 5 is that not only is a portion of the buffer member 190*a* of the display device 100*f* located between the cover 130 protruding from the first substrate 110*a* and the second substrate 110*b*, but other portions also further extend between the first substrate 110*a* and the second substrate 110*b*. Hence, the buffer member 190*a* can have a cross-sectional shape of L.

Figure 9A:
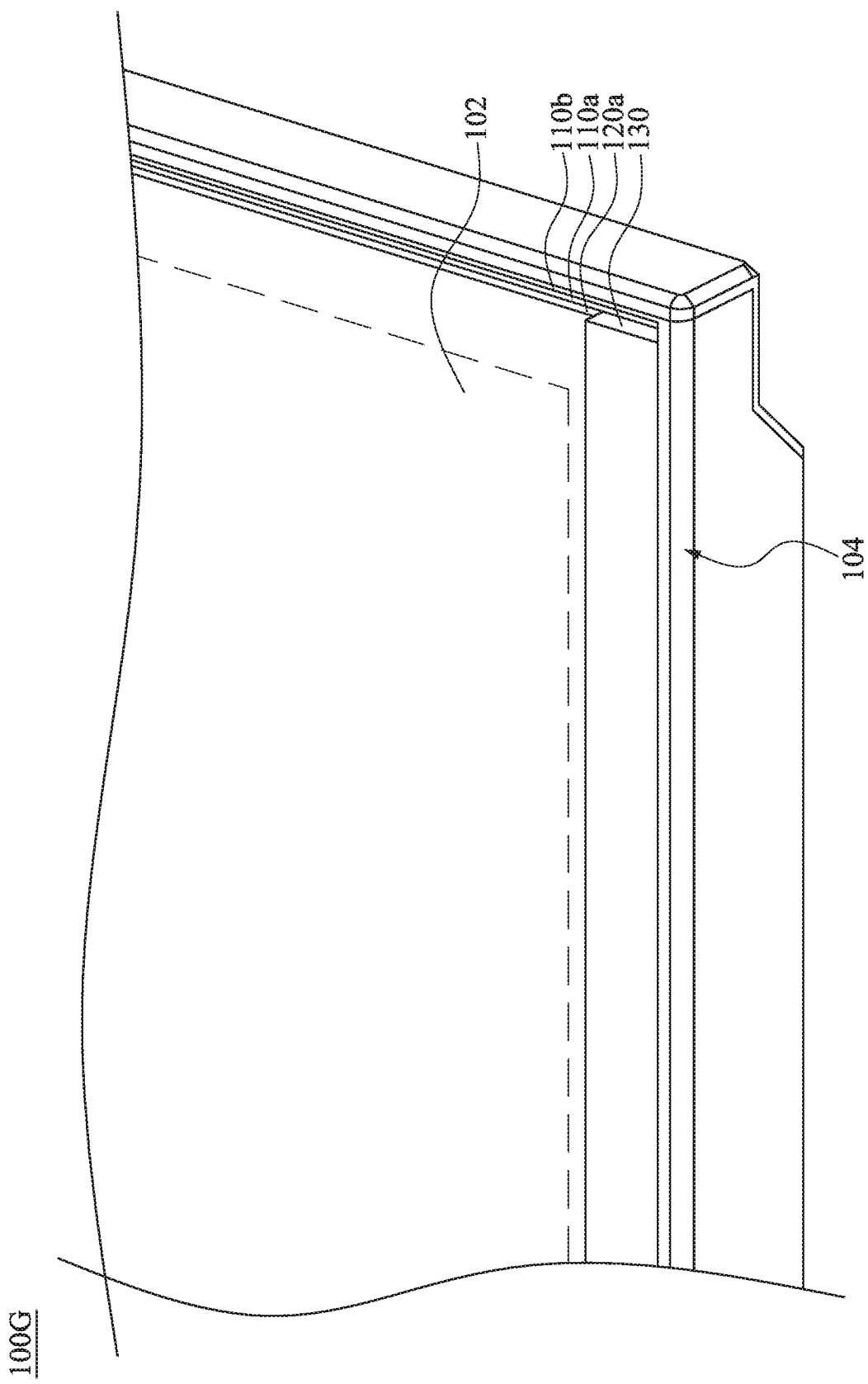
FIG. 9A is a partially schematic perspective view of a display device according to another embodiment of the present invention (an embodiment without a gap)
Figure 10A:
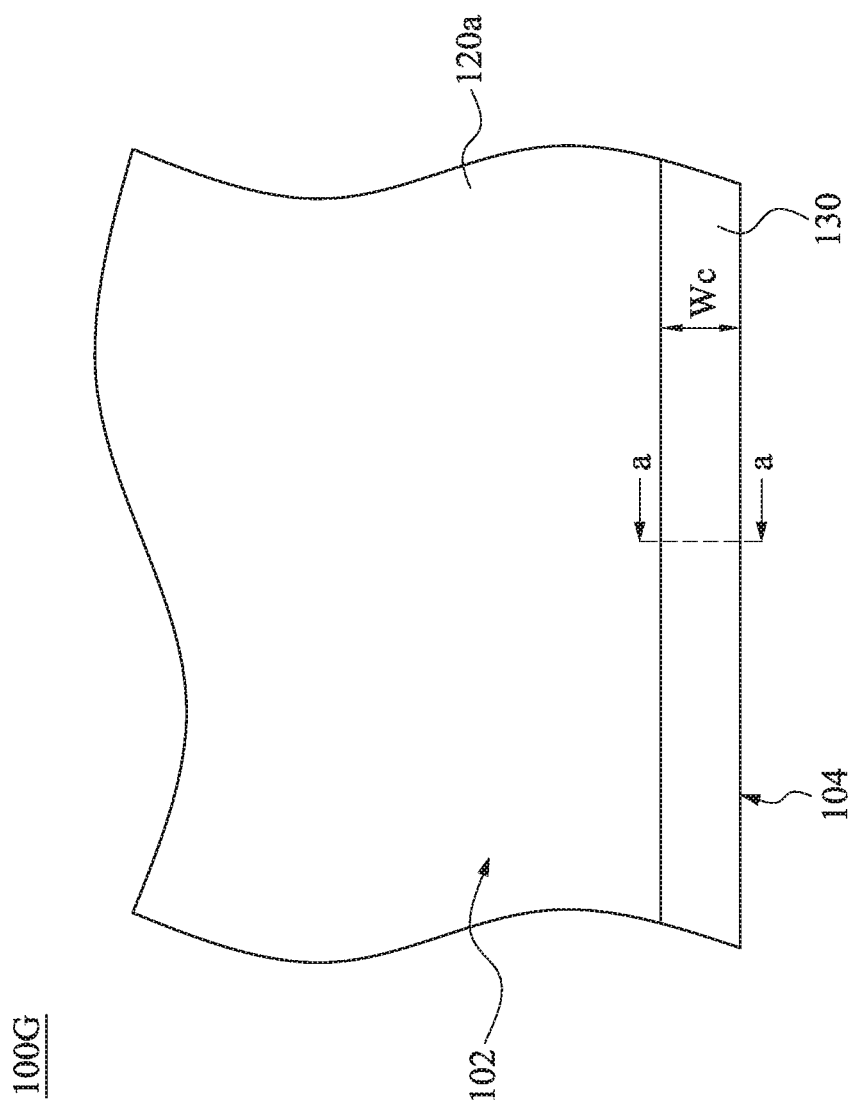
FIG. 10A is a partially front view of the display device shown in FIG. 9A.

FIG. 9A is a partially schematic perspective view of a display device 100G according to another embodiment of the present invention (an embodiment without a gap). FIG. 10A is a partially front view of the display device shown in FIG. 9A. As shown in the figures, the display device 100G has the display area 102. The display area 102 can also be called an active area (AA) that is a range in which a viewer can see images. Generally speaking, the display device 100G has a left side and a right side opposite to each other, and a top side (an upper side) and the bottom side 104 (a lower side) opposite to each other. In the following description, a cross-sectional structure near the bottom side 104 of the display device 100G is used for illustration. However, it is to be noted that the design of the present invention is not limited to the bottom side 104 in practical applications.

Figure 11A:
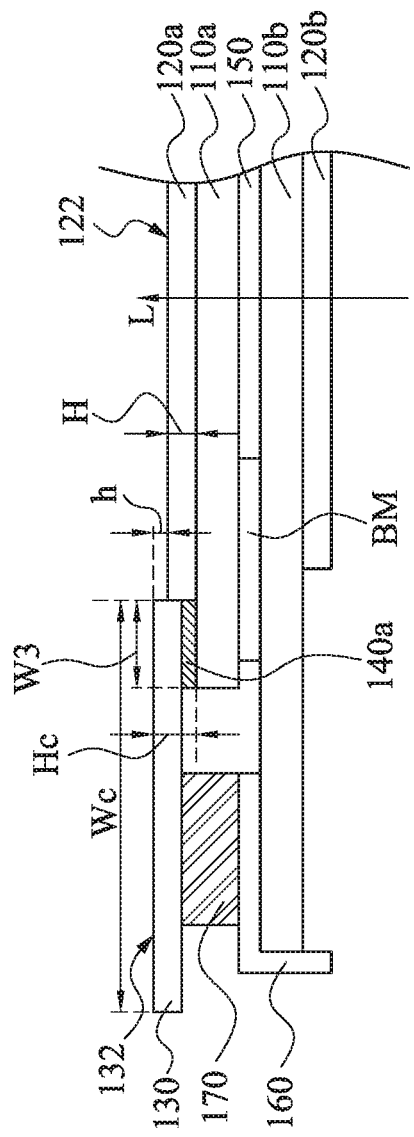
FIG. 11A is a cross-sectional view of the display device taken along line a-a shown in FIG. 10A.

FIG. 11A is a cross-sectional view of the display device 100G taken along line a-a shown in FIG. 10A. As shown in FIG. 9A, FIG. 10A, and FIG. 11A, the display device 100G includes the first substrate 110*a*, the first polarizer 120*a*, and the cover 130. The first polarizer 120*a* is located on the first substrate 110*a*, such that light L passing through the first substrate 110*a* irradiates out from the first polarizer 120*a*. At least a portion of the cover 130 is located on the first substrate 110*a*, and the cover 130 extends away from the first polarizer 120*a* and protrudes from the first substrate 110*a*. In addition, a height difference h is formed between the side 132 of the cover 130 and the side 122 of the first polarizer 120*a* facing away from the first substrate 110*a*. That is, an outer side of the cover 130 and an outer side of the first polarizer 120*a* are not coplanar. In other words, the cover 130 and the first polarizer 120*a* have different heights on a display side of the display device 100G, that is, the side 132 of the cover 130 facing away from the first substrate 110*a* is higher or lower than the side 122 of the first polarizer 120*a* facing away from the first substrate 110*a*. In the embodiment shown in FIG. 11A, the side 132 of the cover 130 facing away from the first substrate 110*a* is higher than the side 122 of the first polarizer 120*a* facing away from the first substrate 110*a*. In other words, the cover 130 and the first polarizer 120*a* are not coplanar on a surface of the display device 100G facing a viewer.

Since the first polarizer 120*a* and the portion of the cover 130 are both located on the first substrate 110*a*, and the height difference h is formed between the side 132 of the cover 130 and the side 122 of the first polarizer 120*a* facing away from the first substrate 110*a*, and a structural design without a gap between the cover 130 and the first polarizer 120*a* is provided, a rimless visual effect on the bottom side 104 of the display device 100G can be achieved by directly connecting the cover 30 (i.e., a trim panel) to an edge of the first polarizer 120*a* (i.e., an upper polarizer) in the display device 100G to form a seamless design. As a result, aesthetic feeling can be effectively enhanced and slimness of the display device 100G is also advantaged.

However, in practical manufacturing processes, due to external factors, such as process accuracies or material tolerances, a gap is formed between edges that are supposed to contact each other when two different materials are combined. Hence, there is a gap between the cover 130 and the first polarizer 120*a*. In the following description, an example in which the gap exists is used for illustration.

FIG. 9B is a partially schematic perspective view of a display device 100g according to another embodiment of the present invention (an embodiment with a gap). FIG. 10B is a partially front view of the display device shown in FIG. 9B. As shown in the figures, the display device 100g has the display area 102. The display area 102 can also be called an active area (AA) that is a range in which a viewer can see images. Generally speaking, the display device 100g has a left side and a right side opposite to each other, and a top side (an upper side) and the bottom side 104 (a lower side) opposite to each other. In the following description, a cross-sectional structure near the bottom side 104 of the display device 100g is used for illustration. However, it is to be noted that the design of the present invention is not limited to the bottom side 104 in practical applications.

Figure 11B:
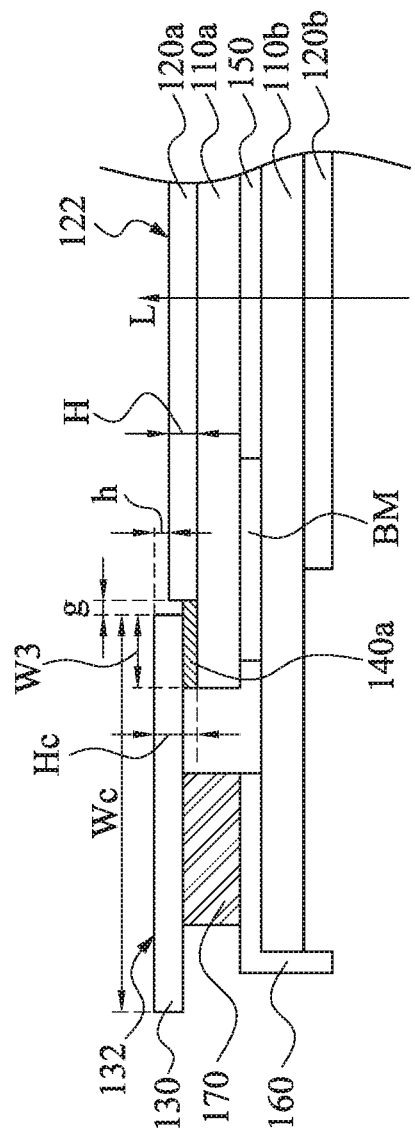
FIG. 11B is a cross-sectional view of the display device taken along line b-b in shown FIG. 10B.

FIG. 11B is a cross-sectional view of the display device 100g taken along line b-b shown in FIG. 10B. As shown in FIG. 9B, FIG. 10B, and FIG. 11B. The display device 100g includes the first substrate 110a, the first polarizer 120a, and the cover 130. The first polarizer 120a is located on the first substrate 110a, such that light L passing through the first substrate 110a irradiates out from the first polarizer 120a. At least a portion of the cover 130 is located on the first substrate 110a, and the cover 130 extends away from the first polarizer 120a and protrudes from the first substrate 110a. In addition, a gap g is formed between the cover 130 and the first polarizer 120a, and a height difference h is formed between the side 132 of the cover 130 and the side 122 of the first polarizer 120a facing away from the first substrate 110a. That is, an outer side of the cover 130 and an outer side of the first polarizer 120a are not coplanar. In other words, the cover 130 and the first polarizer 120a have different heights on a display side of the display device 100g, that is, the side 132 of the cover 130 facing away from the first substrate 110a is higher or lower than the side 122 of the first polarizer 120a facing away from the first substrate 110a. In the embodiment shown in FIG. 11B, the side 132 of the cover 130 facing away from the first substrate 110a is higher than the side 122 of the first polarizer 120a facing away from the first substrate 110a, that is, the cover 130 and the first polarizer 120a are not coplanar on a surface of the display device 100g facing a viewer.

Since the first polarizer 120a and the portion of the cover 130 are both located on the first substrate 110a, a rimless visual effect on the bottom side 104 of the display device 100g can be achieved by directly disposing the cover 130 (i.e., a trim panel) adjacent to an edge of the first polarizer 120a (i.e., an upper polarizer) in the display device 100g. As a result, aesthetic feeling can be effectively enhanced and slimness of the display device 100g is also advantaged. In addition, the height difference h is formed between the side 132 of the cover 130 and the side 122 of the first polarizer 120a facing away from the first substrate 110a, and the gap g (the gap in the figures is schematic, in practical manufacturing, the minimum gap is still the manufacturing guide, and the optimum state is "closely adjacent") caused by joining materials is formed between the cover 130 and the first polarizer 120a, the rimless visual effect of the display device 100g will not be affected. The aesthetic feeling can be maintained, and the slimness design of the display device 100g can also be maintained.

In this embodiment, the first substrate 110a may be a color filter (CF) substrate. The display device 100g further includes the second substrate 110b, the second polarizer 120b, and the liquid crystal layer 150. The second substrate 110b may be a thin film transistor array (TFT array) substrate. The liquid crystal layer 150 is located between the first substrate 110a and the second substrate 110b. The second substrate 110b is located on one side of the first substrate 110a facing away from the first polarizer 120a and the cover 130, that is, located underneath the first substrate 110a, and a portion of the second substrate 110b protrudes from the first substrate 110a. The second polarizer 120b is located on one side of the second substrate 110b facing away from the first substrate 110a. The second polarizer 120b, the second substrate 110b, the liquid crystal layer 150, the first substrate 110a, and the first polarizer 120a stacked from bottom to top may be disposed above a direct type or an side type backlight module (not shown).

The display device 100g may further include the first adhesive layer 140a. The first adhesive layer 140a is located between the cover 130 and the first substrate 110a. That is, the portion of the cover 130 on the first substrate 110a is fixed through the first adhesive layer 140a. Since the first adhesive layer 140a and the cover 130 can be selected from different material combinations, the height difference h thus exists between the side 132 of the cover 130 and the side 122 of the first polarizer 120a facing away from the first substrate 110a according to this embodiment. The height difference h is in a range from −0.1 mm to 0.35 mm (under the circumstances of specific materials, for example, when the first polarizer is thicker and the cover is thinner, the height difference is a negative value if the side 122 of the polarizer 120a is used as a reference). Preferably, the height difference h is in a range from 0.02 mm to 0.29 mm, as shown in Table 1.

TABLE 1

(Unit: mm)

|  | First Polarizer | Cover | First Adhesive Layer |
|---|---|---|---|
| Thickness | 0.13~0.18 | 0.15~0.32 | 0.05~0.10 |
| Sum of Thicknesses | | 0.20~0.42 | |
| Height Difference(h) | | 0.02~0.29 | |

In summary, a sum Hc of a thickness of the first adhesive layer 140a and a thickness of the cover 130 is greater than a thickness H of the first polarizer 120a in this embodiment. The first adhesive layer 140a may be glue or film adhesive having an adhesive force of more than 10 kg/cm2. When the first adhesive layer 140a is the glue, it may be UV-curing adhesive, hot melt adhesive, silicone, polyurethane (PUR) adhesive, or AB glue. A viscosity of the first adhesive layer 140a may be in a range from 200 CPs to 350000 CPs. When the first adhesive layer 140a is the film adhesive, it may be a double-sided adhesive tape, a very high bond (VHB) double-sided adhesive tape, or a thermally conductive adhesive tape. However, the present invention is not limited in this regard.

Additionally, the display device 100g may further include the flexible printed circuit board 160 and a light-shielding portion BM. The light-shielding portion BM is located outside the display area 102 of the display device 100g. In greater detail, the light-shielding portion BM on the bottom side 104 is located between the first substrate 110a and the second substrate 110b and near an edge of the first substrate 110a in this embodiment. In addition, a vertical projection area of the light-shielding portion BM on the first polarizer 120a covers the gap g between the cover 130 and the first polarizer 120a. Similarly, a structure in which the height difference h is formed between the side 132 of the cover 130 and the side 122 of the first polarizer 120a facing away from the first substrate 110a is also covered by the vertical projection area of the light-shielding portion BM on the first polarizer 120a. A chip may be disposed on a surface of the flexible printed circuit board 160 to form a chip on film (COF). The flexible printed circuit board 160 is fixed to the portion of the second substrate 110b protruding from the first substrate 110a, and the flexible printed circuit board 160 extends away from the first substrate 110a. Since the cover 130 extends away from the first polarizer 120a and protrudes from the first substrate 110a, the cover 130 protruding from the first substrate 110a can be used for shielding the flexible printed circuit board 160 or other electronic component underneath. It is thus not necessary to pour black molding compound onto the bottom side of the display device so as to shield and encapsulate the electronic components just as the prior art did. Hence, both the yield rates and reworkability of the flexible printed circuit board 160 or other electronic components underneath the cover 130 can be effectively improved.

Additionally, a width W3 of the cover 130 on the first substrate 110a may occupy 20% to 65% of a total width Wc of the cover 130. Designers can determine the percentage relationship between the width W3 and the total width Wc depending on design requirements. As verified by experiments during the research process of the present invention, the width W3 of the cover 130 on the first substrate 110a occupies 34% to 58% of the total width Wc of the cover 130 (W3 in the figure only serves as an example). Examples of use for various specifications are listed as follows, as shown in Table 2. In the various examples of use shown in Table 2, owing to the evolution of technology and the requirement of the narrow bezel design value, the width value of the cover also varies when the width value is used to cooperate with the design width value of the light-shielding portion BM on the bottom side 104 of the display panel. Hence, in Table 2, the design width values of the light-shielding portion BM on the bottom side 104 of the display panel are used as the narrow bezel design values required by the various examples of use. As a result, under the prerequisite of the different design width values of the light-shielding portion BM shown in Table 2, the percentage (W3/Wc) of the total width Wc of the cover 130 occupied by the width W3 of the cover 130 on the first substrate 110a has a minimum value of 0.34, and has a maximum value of 0.58.

TABLE 2

(Unit: mm)

| Examples | BM | W3 (mm) | Wc (mm) | W3/Wc |
|---|---|---|---|---|
| 1 | 8.8 | 5 | 10.4 | 0.48 |
| 2 | 5.1 | 2.5 | 4.6 | 0.54 |
| 3 | 6.5 | 3.6 | 10.6 | 0.34 |
| 4 | 7.7 | 1.8 | 5 | 0.36 |
| 5 | 6.5 | 3.6 | 6.5 | 0.55 |
| 6 | 5 | 2.6 | 4.5 | 0.58 |

When the cover 130 has a high stiffness, an overhanging portion of the cover 130 is not easy to be depressed. Hence, the width W3 of the cover 130 on the first substrate 110a might be reduced after consideration to obtain the wider display area 102 and a better visual experience. When the W3 of the cover 130 on the first substrate 110a is smaller, the larger first polarizer 120a can be used to be closely adjacent to the cover 130 so as to maintain the gap g within a preset range. A Young's modulus of the cover 130 may be in a range from 0.5 GPa to 500 GPa. The stiffness of the cover 130 may be designed to be higher than or equal to a stiffness of the first polarizer 120a to enhance the strength of an edge of the display device 100g. When a stiffness value of the cover 130 is designed to be equal to a stiffness value of the first polarizer 120a, the cover 130 and the first polarizer 120a can use a same material so as to obtain the optimum visual experience. In addition, the cover 130 may be an opaque sheet material (that is, light transmittance is zero), may be a metal plate, such as an aluminum plate, a stainless steel (SUS) plate, a tin plate, a color steel plate, a steel galvanized aluminum cold rolled (SGLC) plate, or a steel electrogalvanized cold rolled (SECC) plate, may be a non-metallic plate made of polymer plastic, such as a PC plate, a PMMA plate, an ABS plate, a PP plate, a PET plate, a PS plate, a TAC plate and the like, or may be a stack structure of the above materials. However, the present invention is not limited in this regard. Additionally, a surface treatment of the cover 130 may be an appearance treatment, such as baking lacquer, anodizing, electrocoating, electroplating, etc., to enhance the aesthetic feeling of the edge of the display device 100g. Referring to FIG. 15, in greater detail, the side 132 of the cover 130 facing away from the first adhesive layer 140a, that is, the side 132 facing away from the first substrate 110a has the surface treatment layer 131 to achieve the anti-glare objective and/or anti-reflective objective. For example, the surface treatment layer 131 may be an anti-reflection (AR) film or an anti-glare (AG) film. Similarly, the surface treatment layer 131 may be formed by utilizing baking lacquer, anodizing, electrocoating, electroplating.

In addition, the display device 100g may further include the support member 170. The support member 170 is located between the cover 130 and the second substrate 110b. In this embodiment, the support member 170 is located between the cover 130 protruding from the first substrate 110a and the second substrate 110b protruding from the first substrate 110a. The support member 170 can be used for supporting the cover 130 to avoid depression of a portion of the cover 130 outside the first substrate 110a when being pressed by an external force. The support member 170 may be made of an insulating material (e.g., Mylar) to prevent the support member 170 from being conducted with the flexible printed circuit board 160 and a short circuit thus caused.

Figure 12:
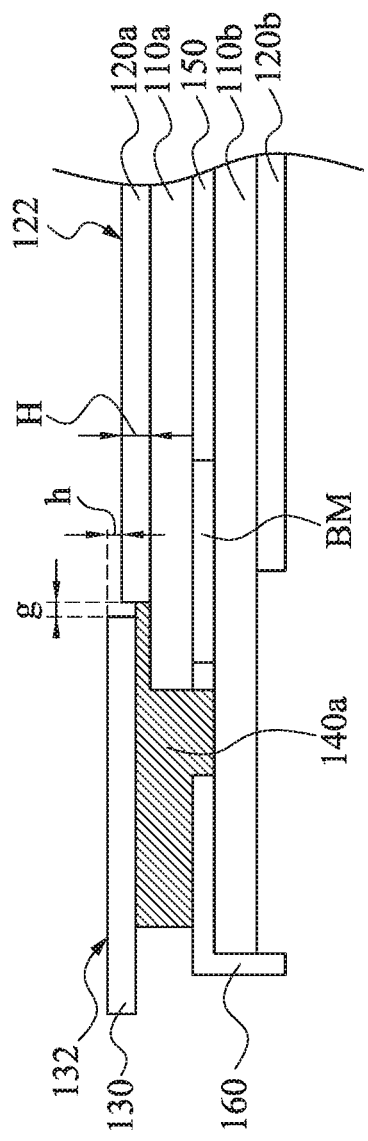
FIG. 12 is a cross-sectional view of a display device according to another embodiment of the present invention.

FIG. 12 is a cross-sectional view of a display device 100h according to another embodiment of the present invention. The display device 100h includes the first substrate 110a, the second substrate 110b, the first polarizer 120a, the second polarizer 120b, the cover 130, and the flexible printed circuit board 160. A height difference h is formed between the side 132 of the cover 130 and the side 122 of the first polarizer 120a facing away from the first substrate 110a. The difference between this embodiment and the embodiment shown in FIG. 11 is that the first adhesive layer 140a extends to a space between the cover 130 and the second substrate 110b from a space between the cover 130 and the first substrate 110a and fills up the space between the cover 130 and the second substrate 110b to eliminate an overhanging portion of the cover 130. The cover 130 is thus co-supported by the first substrate 110a, the first adhesive layer 140a, and the second substrate 110b. When an external force presses the cover 130, the cover 130 is not easy to be depressed and damaged.

Figure 13:
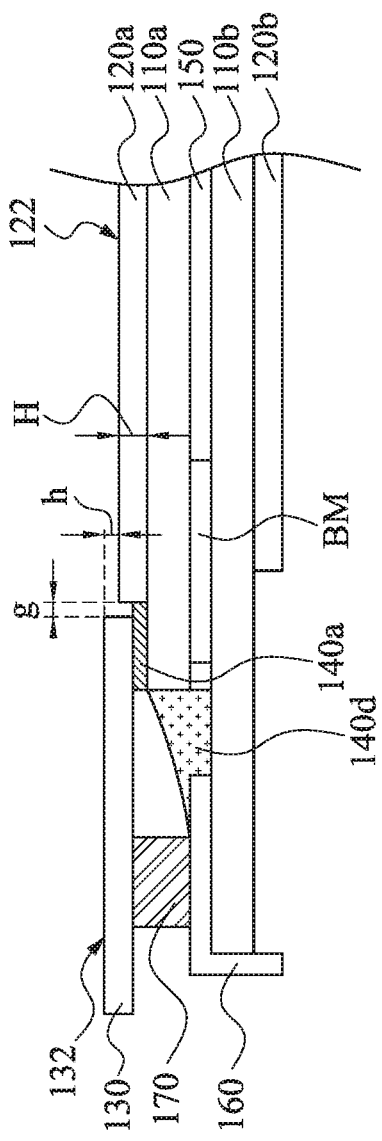
FIG. 13 is a cross-sectional view of a display device according to still another embodiment of the present invention.

FIG. 13 is a cross-sectional view of a display device 100i according to still another embodiment of the present invention. The display device 100i includes the first substrate 110a, the second substrate 110b, the first polarizer 120a, the second polarizer 120b, the cover 130, and the flexible printed circuit board 160. A height difference h is formed between the side 132 of the cover 130 and the side 122 of the first polarizer 120a facing away from the first substrate 110a. The difference between this embodiment and the embodiment shown in FIG. 11 is that the display device 100i has a fourth adhesive layer 140d located on one side of the first substrate 110a and on the second substrate 110b. The fourth adhesive layer 140d partially covers the flexible printed circuit board 160, and the first adhesive layer 140a is located between the cover 130 and the first substrate 110a, and the support member 170 is disposed on the flexible printed circuit board 160. The support member 170 is located between the first substrate 110a and the flexible printed circuit board 160. With such a design, since the support member 170 is located between the cover 130 protruding from the first substrate 110a and the second substrate 110b protruding from the first substrate 110a, the support member 170 can be used for supporting the cover 130 to avoid depression of a portion of the cover 130 outside the first substrate 110a when being pressed by an external force. The support member 170 may be made of an insulating material (e.g., Mylar) to prevent the support member 170 from being conducted with the flexible printed circuit board 160 and a short circuit thus caused.

Figure 14:
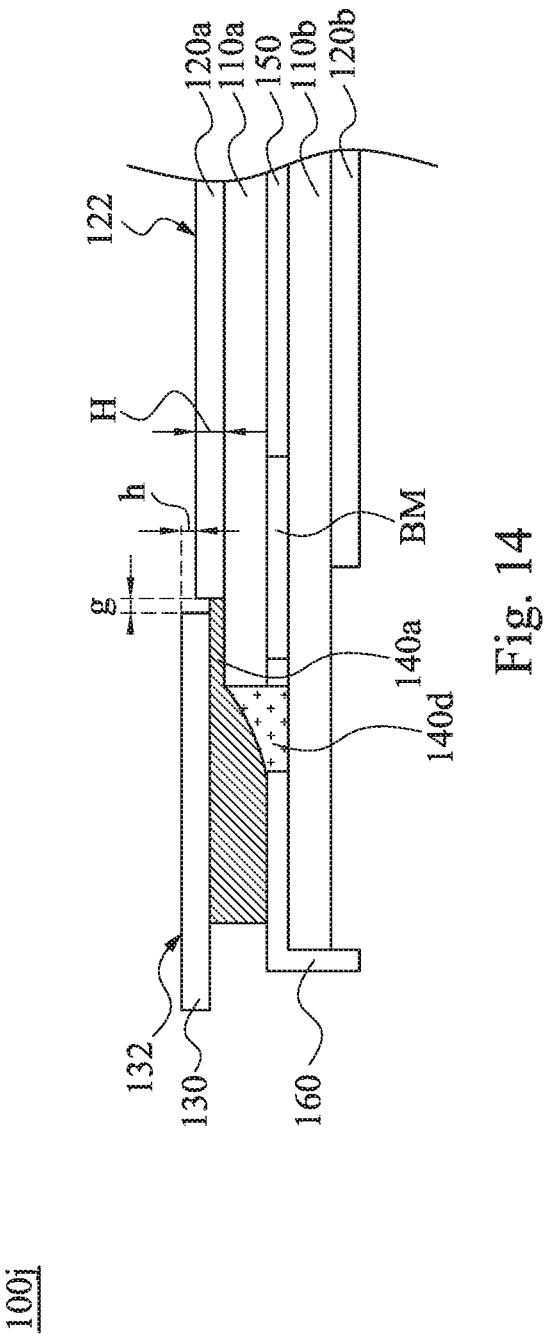
FIG. 14 is a cross-sectional view of a display device according to yet another embodiment of the present invention.

FIG. 14 is a cross-sectional view of a display device 100j according to yet another embodiment of the present invention. The display device 100j includes the first substrate 110a, the second substrate 110b, the first polarizer 120a, the second polarizer 120b, the cover 130, and the flexible printed circuit board 160. A height difference h is formed between the side 132 of the cover 130 and the side 122 of the first polarizer 120a facing away from the first substrate 110a, and the first adhesive layer 140a is located between the cover 130 and the first substrate 110a. In addition, the fourth adhesive layer 140d is located on one side of the first substrate 110a and on the second substrate 110b. Additionally, the fourth adhesive layer 140d partially covers the flexible printed circuit board 160. The difference between this embodiment and the embodiment shown in FIG. 13 is that the first adhesive layer 140a extends to a space between the cover 130 and the second substrate 110b from a space between the cover 130 and the first substrate 110a and covers the fourth adhesive layer 140d and the flexible printed circuit board 160. Through the disposition that the first adhesive layer 140a fills up the space between the cover 130 and the first substrate 110a and extends to the space between the cover 130 and the second substrate 110b, an overhanging portion of the cover 130 can be eliminated. The cover 130 is thus co-supported by the first substrate 110a, the first adhesive layer 140a, and the second substrate 110b. When an external force presses the cover 130, the cover 130 is not easy to be depressed and damaged.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device comprising:
   a first substrate;
   a first polarizer located on the first substrate, such that light passing through the first substrate irradiates out from the first polarizer;
   a cover, at least a portion of the cover being located on the first substrate, and a height difference formed between a side of the cover and a side of the first polarizer facing away from the first substrate;
   a second substrate located on one side of the first substrate facing away from the first polarizer and the cover; and
   a first adhesive layer located between the cover and the first substrate, a sum of a thickness of the first adhesive layer and a thickness of the cover being greater than a thickness of the first polarizer, and the cover extending away from the first polarizer and protruding from the first substrate, wherein a top side of the first adhesive layer is lower than the side of the cover, and the first adhesive layer extends to a space between the cover and the second substrate from a space between the cover and the first substrate.

2. The display device of claim 1, wherein a top side of the first adhesive layer is lower than the side of the first polarizer.

3. The display device of claim 1, further comprising a flexible printed circuit board, and a portion of the second substrate protruding from the first substrate, wherein the flexible printed circuit board is fixed to the portion of the second substrate protruding from the first substrate and extends away from the first substrate, and the first adhesive layer further covers the flexible printed circuit board, and the cover shields the flexible printed circuit board in a vertical projection direction.

4. The display device of claim 1, wherein the height difference is in a range from −0.1 mm to 0.35 mm.

5. The display device of claim 4, wherein the height difference is in a range from 0.02 mm to 0.29 mm.

6. The display device of claim 1, wherein a width of the cover on the first substrate occupies 20% to 65% of a total width of the cover.

7. The display device of claim 6, wherein the width of the cover on the first substrate occupies 34% to 58% of the total width of the cover.

8. The display device of claim 1, wherein a Young's modulus of the cover is in a range from 0.5 GPa to 500 GPa.

9. The display device of claim 1, further comprising a light-shielding portion located between the first substrate and the second substrate and near an edge of the first substrate, and a gap formed between the cover and the first polarizer, and a vertical projection area of the light-shielding portion on the first polarizer covering the gap.

10. The display device of claim 9, wherein the height difference formed between the side of the cover and the side of the first polarizer facing away from the first substrate is also covered by the vertical projection area of the light-shielding portion on the first polarizer.

11. A display device comprising:
   a color filter substrate;
   a first polarizer located on the color filter substrate;
   a cover, at least a portion of the cover being located on the color filter substrate;
   a thin film transistor array substrate located on one side of the color filter substrate facing away from the first polarizer and the cover; and
   a first adhesive layer located between the cover and the color filter substrate, wherein a top side of the first adhesive layer is lower than a top side of the cover;

wherein the cover extends away from the first polarizer and protrudes from the color filter substrate, and a vertical projection area of a portion of the cover protruding from the color filter substrate covers the thin film transistor array substrate, and the first adhesive layer extends to a space between the cover and the thin film transistor array substrate from a space between the cover and the color filter substrate.

12. The display device of claim 11, wherein a surface treatment layer is disposed on one side of the cover facing away from the first adhesive layer.

13. The display device of claim 11, wherein a top side of the first adhesive layer is lower than a top side of the first polarizer.

14. The display device of claim 11, further comprising a flexible printed circuit board, and a portion of the thin film transistor array substrate protruding from the color filter substrate, wherein the flexible printed circuit board is fixed to the portion of the thin film transistor array substrate protruding from the color filter substrate and extends away from the color filter substrate, and the first adhesive layer further covers the flexible printed circuit board, and the cover shields the flexible printed circuit board in a vertical projection direction.

15. The display device of claim 11, wherein a height difference formed between a top side of the cover and a top side of the first polarizer is in a range from 0.02 mm to 0.29 mm.

16. The display device of claim 11, wherein a width of the cover on the color filter substrate occupies 34% to 58% of a total width of the cover.

17. The display device of claim 11, further comprising a light-shielding portion located between the color filter substrate and the thin film transistor array substrate and near an edge of the color filter substrate, and a gap formed between the cover and the first polarizer, and a vertical projection area of the light-shielding portion on the first polarizer covering the gap.

18. The display device of claim 17, wherein a height difference formed between a top side of the cover and a top side of the first polarizer is also covered by the vertical projection area of the light-shielding portion on the first polarizer.

* * * * *